(12) United States Patent
Jascau et al.

(10) Patent No.: US 7,757,230 B2
(45) Date of Patent: Jul. 13, 2010

(54) METHOD OF EXECUTING A PROGRAM ON A COMPUTER, AND COMPUTER PROGRAM PRODUCT

(75) Inventors: Adrian Jascau, Munich (DE); Horatiu Guja, Cluj (RO); Michael Zunke, Aschheim (DE)

(73) Assignee: Aladdin Europe GmbH, Germering (DE)

( * ) Notice: Subject to any disclaimer, the term of this patent is extended or adjusted under 35 U.S.C. 154(b) by 1513 days.

(21) Appl. No.: 10/103,625

(22) Filed: Mar. 21, 2002

(65) Prior Publication Data

US 2003/0110417 A1    Jun. 12, 2003

(30) Foreign Application Priority Data

Dec. 10, 2001    (EP)    .................. 01129442

(51) Int. Cl.
G06F 9/44       (2006.01)
G06F 9/45       (2006.01)
G06F 15/16      (2006.01)

(52) U.S. Cl. .................. 717/175; 717/121; 717/177; 717/178; 709/231; 709/236

(58) Field of Classification Search ......... 717/168–178, 717/127; 714/38, 39; 713/187; 709/231; 726/29
See application file for complete search history.

(56) References Cited

U.S. PATENT DOCUMENTS

| | | | |
|---|---|---|---|
| 161,486 A * | 3/1875 | Arendt | 91/180 |
| 866,612 A * | 9/1907 | Kingsbury | 68/43 |
| 907,007 A * | 12/1908 | Breslau | 149/56 |
| 4,847,902 A * | 7/1989 | Hampson | 713/190 |
| 5,638,513 A * | 6/1997 | Ananda | 726/5 |
| 5,708,811 A * | 1/1998 | Arendt et al. | 717/163 |
| 5,765,205 A * | 6/1998 | Breslau et al. | 711/203 |
| 5,812,810 A * | 9/1998 | Sager | 712/216 |
| 6,014,651 A * | 1/2000 | Crawford | 705/400 |
| 6,049,853 A * | 4/2000 | Kingsbury et al. | 711/147 |
| 6,523,118 B1 * | 2/2003 | Buer | 713/189 |
| 6,671,813 B2 * | 12/2003 | Ananda | 726/3 |
| 6,721,891 B1 * | 4/2004 | Borza | 726/20 |
| 7,096,253 B2 * | 8/2006 | Vinson et al. | 709/203 |
| 7,281,246 B1 * | 10/2007 | Rapakko et al. | 717/175 |
| 7,287,166 B1 * | 10/2007 | Chang et al. | 713/187 |
| 2001/0011254 A1 * | 8/2001 | Clark | 705/59 |
| 2002/0161908 A1 * | 10/2002 | Benitez et al. | 709/231 |

FOREIGN PATENT DOCUMENTS

| | | | | |
|---|---|---|---|---|
| EP | 0866612 A1 | 9/1998 | | 149/56 |
| WO | WO 99/07007 | 2/1999 | | 68/43 |
| WO | WO 00/05637 | 2/2000 | | |
| WO | WO01/61486 A2 | 8/2001 | | 91/180 |

* cited by examiner

*Primary Examiner*—Tuan Q Dam
*Assistant Examiner*—Isaac T Tecklu
(74) *Attorney, Agent, or Firm*—Drinker Biddle & Reath LLP

(57) ABSTRACT

A method of executing a program (2) on a computer (3) comprising a main memory (6) divided into pages comprises the steps of:

loading a main section (7) of the program comprising a manipulating module into the main memory (6) and executing the main section (7), whose manipulating module (12) effects a manipulation of a first of a plurality of program blocks (8, 9, 10) of the program every time a predetermined page error is generated upon an attempt to access the first program block (8, 9, 10).

18 Claims, 2 Drawing Sheets

METHOD OF EXECUTING A PROGRAM ON A COMPUTER, AND COMPUTER PROGRAM PRODUCT

CROSS-REFERENCE TO RELATED APPLICATION

This application claims priority of European patent application no. 01129442.8, filed Dec. 10, 2001, the complete disclosure of which is hereby incorporated by reference.

FIELD OF THE INVENTION

The invention relates to a method of executing a program on a computer as well as to a computer program product.

BACKGROUND OF THE INVENTION

It is often desired to subsequently provide executable programs with an additional function, such as a software copy protection, enabling execution of the program only if a licence is present. To this end, the program or parts thereof may be encrypted, and a decryption occurs only in the presence of such licence. Adding the function is effected by automatic embedding or wrapping, as it is called, wherein a modified executable program is generated, which then comprises the additional function. A disadvantage of such automatic embedding is that the execution of the additional function, i.e. the decryption, must be effected for the entire program upon loading the program. This dramatically increases the program loading time.

The disadvantage of the long start time also exists when downloading a program from a server to a computer, since the program to be downloaded can only be started on the computer once it has been completely transmitted to the computer. As current programs are often some 10 to some 100 megabytes in size, the downloading of programs is, in many cases, of no interest to many users due to the long download time.

WO 00/05637 A2 discloses the continuous and transparent downloading of modules associated with an application, with a loading sequence being defined for the individual modules according to predetermined criteria. The downloading of the modules of the application requires a separate program, which in turn, if it is not present on the computer, must also be downloaded. This has the disadvantage of increasing the time required to download the application.

SUMMARY OF THE INVENTION

In view thereof, it is an object of the present invention to provide a method of executing a program on a computer, by which the time period between selecting the program and the moment when the program is enabled can be shortened.

This object is achieved by a method of executing a program on a computer having a main memory divided into (preferably equally dimensioned) pages, wherein the program contains a plurality of program blocks of the same size as the pages as well as a main section having a manipulating module and the method comprises the steps of:

Loading the main section into the main memory and executing the main section, whose manipulating module causes manipulation of one of the program blocks if, upon an attempt to access said one program block, a predetermined page error is generated.

Thus, the manipulation of said one (first) program block, which comprises, for example, loading it into the main memory and/or decrypting the first program block, can only be executed when the first program block is actually needed to run the program. Therefore, it is no longer required to manipulate the entire program at the start according to the desired function, but a manipulation is always carried out only on those program sections or blocks which are actually needed at that moment.

A preferable further embodiment of the method according to the invention provides that, during manipulation in addition to manipulating said one program block, at least another of the program blocks is manipulated. Said another program block is, e.g. a program block which is executed together with said one program block. An effective manipulation is thus achieved, because associated program blocks are manipulated together.

In particular, such manipulation can be effected only if, during execution of the program, no code of said one program block has been executed yet. This advantageously allows to ensure that the manipulation of the program block(s) is carried out only once, so that an undesired multiple manipulation, leading to slower execution of the program, can be avoided.

Alternatively, of course, said manipulation may also be carried out whenever the predetermined page error occurs several times during execution of the program. In such case, the manipulation may consist, for example, in resuming execution of the program only if a licence (which depends, for example, on the presence of a copy protection plug on the computer) is present.

A page error, as defined herein, is any interruption of the execution of the program which occurs when the page of the main memory in which the first program block is stored is accessed, or which occurs because the first program block is not stored in the main memory at all. In other words, a page error occurs whenever a program block which needs to be accessed for execution of the program cannot be accessed during execution of the program.

In a preferred embodiment of the method according to the invention, an operating system comprising an exception handler is installed on the computer, wherein, upon an attempted access, execution of the program is interrupted and the page error is communicated to the exception handler, which transmits it to the manipulating module, causing said manipulation and, at the same time, also a removal of the condition generating the page error, and then notifies the exception handler thereof.

The page error may be one which is, or is not, removable by the exception handler. If it is a page error which can not be removed by the exception handler, the operating system is thus put in such an exceptional condition that it requires the support of the program to ensure the treatment of said page error and the continuation of the program. Thus, in the method according to the invention, the loading sequence of the individual program blocks is not predetermined by the program, but determined by the operating system, so that the method is particularly easy to realize. Also, only the program blocks currently needed are manipulated in each case, which makes the loading time very short.

In particular, the operating system may comprise a virtual memory management, and the page error may be a specific page error of the virtual memory management. Such page error may be, for example, the page error PAGE-NOT-PRESENT or GUARD-PAGE.

The page error PAGE-NOT-PRESENT occurs if, during execution of the program, a program block is to be accessed, which is not present in the (physical) main memory. Therefore, execution of the program is interrupted, and this is communicated to the exception handler of the operating system, which then ensures that the program block is loaded into the physical main memory and execution of the program is resumed at the instruction where the page error occurred. In the GUARD-PAGE page error, the corresponding program block is stored in the physical main memory, but marked as a GUARD-PAGE, which the processor of the computer is not allowed to access. Therefore, upon an attempted access, the GUARD-PAGE page error is generated, execution of the program is interrupted and the page error is communicated to the exception handler. This page error cannot be removed by the exception handler itself, but it is possible that the exception handler may branch to an adjustable address if a page error occurs which it cannot remove. Said address is defined such by the main section that the branching leads to the manipulating module.

In a further preferred embodiment of the method according to the invention, the program is stored on a second computer, and the manipulating module effects transmission of the first program block as well as, optionally, said at least another program block from the second to the first computer during manipulation. This may accelerate the download of the program from the second to the first computer and the start of the program, because, at the time of execution and usability of the program, only the main section must be present on the first computer. If, during execution of the program, the first program block or further program blocks should be required, which are not present in the first computer, the manipulating module effects subsequent loading thereof. Thus, only what is actually needed during execution of the program is transmitted.

The second computer may be provided as a single computer or also as a computer network. In particular, it is also possible that the main section, on the one hand, and the program blocks, on the other hand, are stored in different areas (e.g. with different access rights) of the second computer. This is advantageous, for example, if the main section is stored in a drive of the second computer, which drive is a mapped drive of the first computer (i.e. the first computer may access this drive as if it were its own drive, although the mapped drive is linked to the first computer via a data link (e.g. the internet)). Since the restriction of access rights of the first computer with regard to the mapped drive is very difficult, if not impossible, the program could be easily copied if stored on the mapped drive. However, if the program blocks are stored, e.g., on another drive (with restricted rights of access) of the second computer, unauthorized copying may be prevented. This is of particular interest for providers who offer software for rent via a network (e.g. the internet).

Further, a placeholder for said one program block may be provided in the main section, said placeholder being smaller than said one program block and occupying the space in the first computer required by said one program block, the placeholder being transmitted together with the manipulating module from the second to the first computer, and the predetermined page error being generated, if, during an attempt to access said one program block, an attempt is made to access said one placeholder. This method is particularly preferable if, before starting the program, the first computer performs a plausibility check on whether the program size indicated in the program corresponds to the actual program size. The considerably smaller placeholder shortens the transmission time until the program is started. Also, the placeholder may occupy the space required by said one program block as well as that required by the at least another program block, in which case the at least another program block is transmitted together with said one program block. In particular, a placeholder may be provided for each program block, which may further reduce the duration of transmission.

Further, this object is achieved by a computer program product for execution on a computer comprising a main memory divided into pages (preferably identical in size), wherein the computer program product comprises a plurality of program blocks of the same size as the pages and a main section having a manipulating module, which contains software code causing manipulation of one of the program blocks during execution of the product on the computer, if, upon an attempt to access said one program block, a predetermined page error is generated. Thus, the start of the computer program product may be accelerated, because said one program block is only needed when it is accessed. Thus, the loading and/or decryption, for example, carried out during manipulation may be performed as required, and need not be effected for the entire program at the time the program is started.

In particular, (because of the software code) such manipulation can be effected only if, during execution of the program, no code of said one program block has been executed yet. This advantageously ensures that the desired manipulation has to be carried out only once during execution of the program, so that the deceleration in the execution of the program may be kept to a minimum.

A particularly preferable embodiment of the computer program product according to to the invention provides that (due to the software code), when said one program block is manipulated, at least another of the program blocks is manipulated as well. This at least another program block may preferably be one which is executed together with said one program block, so that an effective manipulation of associated program blocks may be carried out.

Further, on the computer, an operating system comprising an exception handler may be installed, to which the page error is communicated and which transmits it to the manipulating module, the manipulation and, at the same time, also a removal of the condition causing said page error is caused by the manipulating module, and this is then communicated to the exception handler. This allows the computer program product according to the invention to be easily realized, because it is based on the exception handler of the operating system.

In particular, the operating system may comprise a virtual memory management, wherein the page error is a specific page error of the virtual memory management, and the page error may or may not be removable by the exception handler. In this embodiment, it is particularly easy to realize branching from the exception handler to the manipulating module. Thus, the main section may comprise software code which, when being executed on the computer, causes the manipulating module to be embedded in or hooked in the executive path of the exception handler.

A preferable embodiment of the computer program product according to the invention provides that, if the computer program product is stored on a second computer, the manipulating module causes transmission of said one (first) program block, during manipulation thereof, from the second to the first computer. Thus, on-demand loading is realized, so that the start of the program may be effected extremely fast on the first computer.

In particular, a placeholder for said one program block may be provided in the main section, which placeholder is smaller than said one program block and occupies the space in the first computer required by said one program block, said placeholder being transmitted together with the manipulating module from the second to the first computer and the predetermined page error being generated, if the attempt to access said one program block is an attempt to access said one placeholder. Also, one placeholder each may be provided for several or for all of the program blocks. This allows the computer program product according to the invention to be adapted also to a computer which only starts a program if the operating system can access the entire program. The placeholder(s) give(s) the operating system the illusion of the actual program size, and transmission of the placeholders requires much less time than if the program with the program blocks had to be transmitted.

It is further possible that the placeholder may occupy the space required by said one program block as well as that required by said at least another program block, in which case said at least another program block is additionally transmitted together with said one program block.

In the computer program product according to the invention, the placeholder(s) may be provided with an attribute generating the predetermined page error. Such attribute may be, e.g., the marking as a GUARD-PAGE. Thus, it is particularly easy to provide the computer program product according to the invention, and this also allows an already executable program to be subsequently treated such that it may be quickly started. It is merely required to provide the desired program blocks with placeholders having said attribute, and a main section, in order to realize the computer program product according to the invention. There is no need to know any source code of the program to be treated.

The computer program product according to the invention may be stored on a (readable) storage medium. This may comprise, e.g. a diskette, a CD, a DVD, a magneto-optical plate, a hard disk or a magnetic tape.

The invention will be explained in more detail below, by way of example, and with reference to the drawings.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 1:
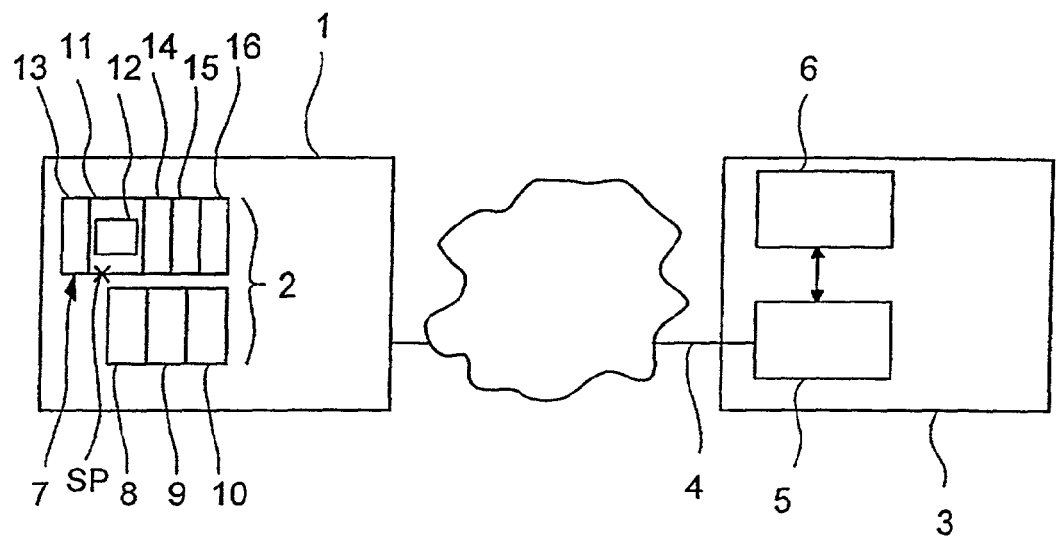
FIG. 1 shows a schematic view of the system according to the invention for executing, on a second computer, a program stored on a first computer.

The method of executing a program on a computer according to the invention may be applied to a system as shown in FIG. 1, which comprises a first computer 1, on which a program 2 is stored, and a second computer 3, on which the program 2 is to be executed. The second computer 3 is connectable to the first computer 1 via a data link 4, which may be, for example, an internet connection.

The second computer 3 contains the usual hardware components, such as input and output devices, a processor, a non-volatile memory 5 (e.g. a hard disk) and a (volatile) main memory 6. Of these hardware components FIG. 1 only shows the non-volatile memory 5 and the main memory 6.

Further, an operating system comprising what is known as a virtual memory management and an exception handler, as it is called, is also installed on the second computer 3.

In the virtual memory management, when an executable program is started, the operating system allocates the program to a virtual memory (which may be considerably larger than the main memory 6). The virtual memory and the main memory are each divided into individual pages S1-S10 and A1-A7 respectively (preferably identical in size), or the operating system treats and manages the virtual memory and the main memory as if they consisted of said pages, so that one single page of the virtual memory is then, e.g., covered by the physical memory (i.e. the page is loaded into the main memory 6 and the code of the page may be executed by the processor), if the page of the virtual memory is to be accessed during execution of the program.

In order to carry out such memory management in a manner transparent to the program, the operating system is provided with the exception handler which is called as soon as a page error occurs. A page error occurs if, during execution of the program, a program page in the virtual memory cannot be accessed, because said program page, for example, is not stored in the main memory, or because the program page 2 is stored in the main memory 6, but there is no authorization to access it. In this case, execution of the program is interrupted and a corresponding page error is generated, which is transmitted to the exception handler of the operating system together with the page number of the virtual page, which is to be accessed. If, for example, said page is not present in the main memory 6, the page error PAGE-NOT-PRESENT is generated, in which case the exception handler removes the page error by loading the required page into the main memory 6 and causing program execution to be resumed at the point (i.e. at the instruction) where the page error occurred. With the page now being present in the main memory 6, execution of the program may be resumed. Operating systems having a virtual memory management and an exception handler include, e.g., the 32-bit operating systems of Microsoft (such as Windows NT, Windows 2000, Windows 9x, Windows ME).

The (executable) program 2 stored in the first computer 1 comprises a main section 7 as well as a plurality of program blocks, of which FIG. 1 shows blocks 8, 9 and 10 as examples. The size of the program blocks 8 to 10 is selected such that it corresponds to the size of the pages in the virtual memory of the second computer 3.

The main section 7 comprises a starting block 11 having a manipulating module 12 and an information block 13, which contains, among others, the information which the operating system of the second computer 3 requires for execution of the program 2. For example, this includes the program size, the program starting point SP in the starting block 11 and the file type of the main section 7. Further, for each of the program blocks 8 to 10, the main section 7 contains a placeholder section 14, 15, 16, each requiring as much memory in the second computer 3 as their associated program blocks 8 to 10, but being smaller than the program blocks 8 to 10. If the program blocks 8 to 10 are each, for example, 32 kByte in size, each placeholder 14 to 16 may contain the instruction 32 kx,,0", so that the actual size of a placeholder section 14 to 16 is substantially smaller than the space to be reserved for it in the second computer 3.

Further, the placeholder sections 14 to 16 are additionally marked with the GUARD-PAGE attribute, which, as shall be described below, causes a GUARD-PAGE page error to be generated upon an attempt to access such page loaded into the main memory 6, which error cannot be removed by the exception handler.

If the user of the second computer 3 now wishes to execute the program 2 on his computer 3, it is not the entire program 2 which is downloaded to the second computer 3 via the data link 4. Instead, due to the described program structure of the program 2, only the main section 7 is first transmitted to the second computer 3 and temporarily stored therein, e.g. in the non-volatile memory 5. The transmission time of the main section 7 is considerably shorter than that of the entire program, because the placeholders are smaller than the program blocks and, accordingly, the data volume to be transmitted is strongly reduced.

As the program size is indicated in the information block 13 of the main section 7 and this size is also consumed by the placeholder sections 14, 15, 16 in the non-volatile memory 5, the required space is reserved for the individual program blocks 8 to 10 during the allocation carried out before execution of the program 2 by the operating system in the virtual memory. Also, because of the placeholders 14 to 16, the operating system is given the illusion of the actual program size, so that the operating system, optionally conducting a plausibility check of the indicated program size against the actual program size before reserving the virtual memory, arrives at a positive result and does not abort the desired execution of the program already at this point.

Figure 2:
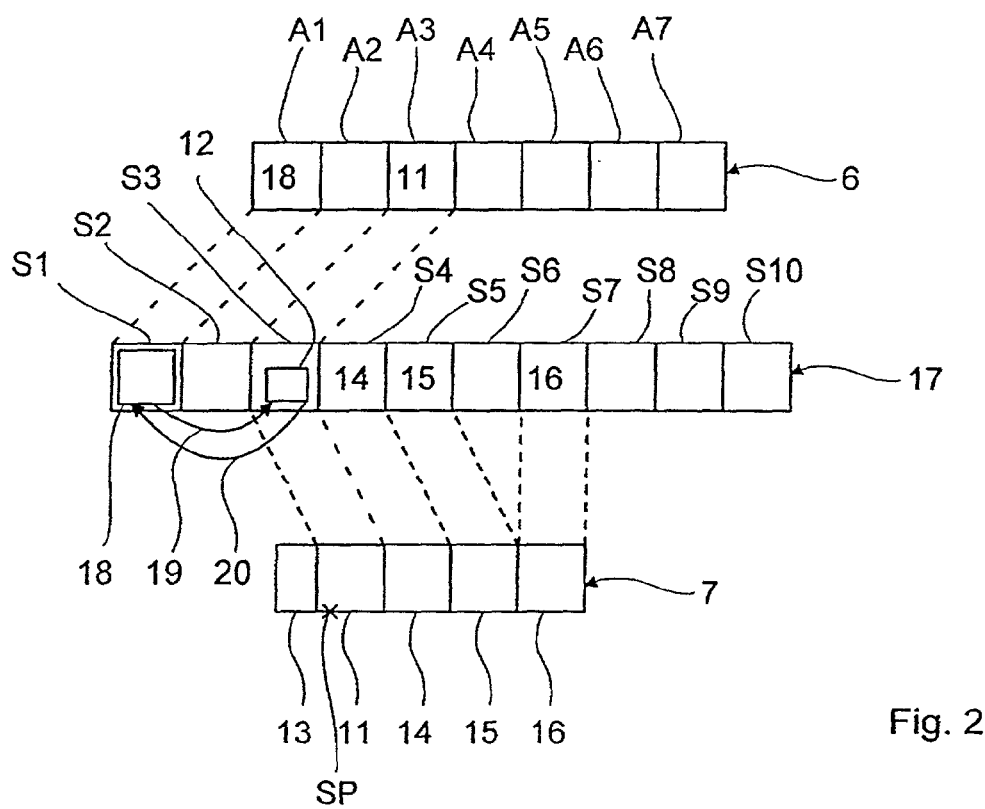
FIG. 2 is a schematic representation explaining the virtual memory management.

FIG. 2 schematically shows the allocation of the program 2 in the virtual memory 17, which is divided into the identically dimensioned pages S1 to S10. Thus, the starting block 11 is allocated to page S3, and pages S4, S5 and S7 are reserved for placeholders 14 to 16. Since the program starting point SP is present in the starting block 11, page S3 allocated to the starting block 11 is covered by main memory 6 (memory block A3). Further, the exception handler 18, which is stored in memory block A1 of the main memory 6, is indicated in page S1 of the virtual memory 17 of the operating system.

The starting block 11 contains a first routine, by which the manipulating module 12 is hooked in the executive path of the exception handler 18. To this end, for example, a bypass via the manipulating module 12 is generated (as indicated by arrows 19 and 20). Thus, the manipulating module 12 is informed about page errors and may intervene, if required.

Figure 3:
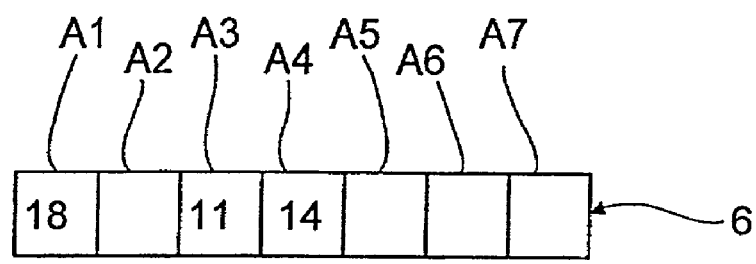
FIG. 3 shows a schematic representation of the memory allocation of the main memory 6.

If the program block 8 is to be accessed now, for example, during execution of the program in the condition shown in FIG. 2, the execution of the program is interrupted and the page error PAGE-NOT-PRESENT is generated, because neither the program block 8 nor the placeholder 14 (which is the program block required by the second computer 3) are stored in the main memory 6. The page error PAGE-NOT-PRESENT and the corresponding page address in the virtual memory are communicated to the exception handler 18, which then ensures that the missing program block and thus, in this case, the placeholder 14 is loaded into the main memory 6 (e.g. into memory block A4), as schematically represented in FIG. 3. Further, the exception handler 18 causes the program 2 to be resumed at the point (or at the instruction) where the page error was generated.

Figure 4:
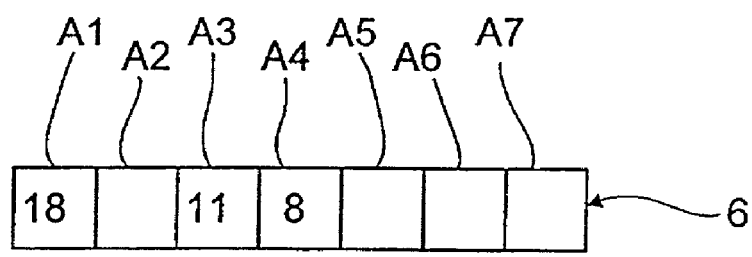
FIG. 4 is a further schematic representation of the memory allocation of the main memory 6.

Upon the renewed access attempt resulting therefrom, execution of the program is interrupted again and a page error is generated, because the placeholder 14 is marked with the GUARD-PAGE attribute. The generated GUARD-PAGE page error is transmitted to the exception handler 18, which finds that it cannot treat this page error. Instead, because of the manipulating module 12 hooked in the executive path of the exception handler 18, branching is effected thereto, as indicated by the arrow 19. The manipulating module 12 also receives the information from exception handler 18 in which program block (or in which page of the virtual memory 17) the page error was generated. Using this information, the manipulating module 12 causes the corresponding program block to be loaded via the data link 4 into the main memory 6 (in this case, memory block A4, as shown in FIG. 4) and branches back to the exception handler 18, which effects repetition of the instruction that led to the page error. This time, the program block 8 can be accessed, allowing execution of the program to be resumed.

In this manner, even large programs can be executed very fast on the second computer 3, because, at the time the program is started, only the small main section 7 needs to be transmitted to the second computer 3. All other required program blocks 8, 9, 10 may be subsequently loaded, as required, in the course of execution of the program. Of course, it is possible, in the above method, that the starting block 11 is not yet stored in the main memory 6 at the starting time. The attempt to access the starting block 11 at the start will then lead to the page error PAGE-NOT-PRESENT, which is removed by the exception handler 18 in the above-described manner.

In a preferred embodiment, a decryption and/or a decompression may also be carried out, during subsequent loading of program blocks 8 to 10, by the manipulating module 12, so that, advantageously, it is always the currently required program block which is decrypted and/or decompressed. This considerably shortens the time between the program call by the user and the time at which the program is actually usable.

The method according to the invention may also be employed to execute the program 2 as quickly as possible on the computer on which it is stored. In such case, the program 2 is preferably provided with a software copy protection. This means that the execution of the program is enabled only in the presence of a licence. In principle, the procedure is the same as in the above-described method, the only difference being that no transmission via the data link 4 is required now.

Thus, during execution of the program, the starting block 11 is loaded into the main memory of the computer. If the program block 8 is to be accessed during execution, the page error PAGE-NOT-PRESENT is generated, because the corresponding placeholder 14 is not present in the main memory. This page error is communicated to the exception handler of the operating system, which causes the placeholder 14 to be loaded into the main memory. Then, the execution of the program is resumed at the point of interruption, so that another attempt is made to access the placeholder 14. As said placeholder is provided with the GUARD-PAGE attribute, another page error (this time the GUARD-PAGE page error) is generated and communicated to the exception handler. The latter cannot remove this page error, and branching is effected to the manipulating module 12.

The manipulating module 12 can then check, for example, whether the required licence is present. If this is not the case, the execution of the program is aborted. If the licence is present, however, this will cause the program block 8 to be loaded into the main memory, and branching back to the program instruction which generated the page error is effected via the exception handler.

Alternatively, the program block 8 may be stored in encrypted form, and the manipulating module additionally carries out a decryption of the program block 8, so that the decrypted program block is then stored in the main memory.

This method allows a check on the authorization to run the program 2 and, optionally, also the required decryption to be performed only when the respective program block is actually needed. Consequently, it is no longer required to first decrypt all program blocks upon calling the program 2, in order to make the program fit for use by the operator.

Further, it is also possible that the main section 7 may not contain any placeholders and that, instead, each of the program blocks 8 to 10 is provided with the GUARD-PAGE attribute. This causes the page error GUARD-PAGE to be generated upon accessing the program blocks 8 to 10, if they are stored in the main memory, which error cannot be removed by the exception handler, so that branching to the manipulating module 12 is effected in connection with the treatment of said page error. This module checks whether the licence is present, and if this is the case, the manipulating module 12 informs the exception handler that the page error has been removed, and execution of the program is resumed via the exception handler at the instruction which caused the page error, and this time, the processor of the computer can access the program block. If the manipulating module 12 finds, as a result of said check, that there is no licence, it causes the execution of the program to be aborted. This may be effected, for example, by the manipulating module informing the exception handler that it cannot remove the page error. Since the exception handler is also unable to remove said page error, it causes abortion of the program.

Instead of the above-described GUARD-PAGE attribute, the embodiments described herein may also use any other attribute leading to a page error which the exception handler cannot remove. The manipulating module 12 may also be hooked in the executive path of the exception handler in such a manner that it is informed about all page errors which occurred during execution of the program, or about all page errors in general. In such case, the manipulating module may intervene, for example, already when the page error PAGE-NOT-PRESENT occurs.

The starting section 7 comprising the manipulating module may be generated for an already present, executable program by way of a wrapping method known from software copy protection, so that the method according to the invention is easy to apply also to already translated (executable) programs. Further, it is also possible, of course, to already create the programs such that the method according to the invention is executable (e.g. by adapting the compiler accordingly).

Even though a particular embodiment of the invention has been illustrated and described herein, it is not intended to limit the invention and changes and modifications may be made therein within the scope of the following claims.

What is claimed is:

1. A method of executing a program embodied in a storage medium on a computer having an operating system and a main memory, the operating system comprising an exception handler, the main memory being divided into pages, the program contains a plurality of program blocks and a main section, the program blocks being of the same size as said pages of the main memory, said main section having a manipulating module, the method comprising the steps of:
   (a) loading the main section into the main memory, said main section having a placeholder for one program block, which is smaller than said one program block, and occupies the space required by said one program block in the computer;
   (b) executing the main section;
   (c) attempting to access said one program block of the program blocks, thus attempting to access said placeholder;
   (d) generating a predetermined page error associated with said attempting to access said placeholder;
   (e) interrupting the execution of the program;
   (f) communicating the page error to the exception handler;
   (g) removing the condition causing said page error;
   (h) the exception handler forwarding the page error to the manipulating module;
   (i) said manipulating module being executed, causing manipulation of said one program block of the program blocks; and
   (j) continuing execution of the program.

2. The method as claimed in claim 1, wherein the manipulation is effected only if, during execution of the program, no code of said one program block has been executed yet.

3. The method as claimed in claim 1, wherein said manipulation comprises at least one of loading said one program block into the main memory and decrypting said one program block.

4. The method as claimed in claim 1, wherein, during said manipulation, at least another of the program blocks is manipulated in addition to manipulating said one program block.

5. The method as claimed in claim 4, wherein said manipulation comprises at least one of loading said at least another program block into the main memory and decrypting said at least another program block.

6. The method as claimed in claim 1, wherein the operating system comprises a virtual memory management and the page error is a specific page error of the virtual memory management.

7. The method as claimed in claim 1, wherein the program is stored on a second computer and the manipulating module effects a transmission of said one program block from the second to the first computer during manipulation.

8. The method of claim 1 wherein the method further includes the step of hooking the manipulating module in the exception handler, thereby informing the manipulating module about page errors.

9. A computer program product embodied in a storage medium for execution on a computer having an operating system and a main memory, the operating system comprising an exception handler, the main memory being divided into pages, the computer program product comprising:
   (A) a plurality of program blocks of the same size as the pages of said main memory;
   (B) a main section having a manipulating module; and
   (C) a software code contained in said manipulating module, said code adapted for supporting a method comprising the steps of:
   (a) loading the main section into the main memory, said main section having a placeholder for one program block, which is smaller than said one program block, and occupies the space required by said one program block in the computer;
   (b) executing the main section;
   (c) attempting to access one program block of the program blocks, thus attempting to access said placeholder;
   (d) generating of a predetermined page error associated with said attempting to access said placeholder;
   (e) interrupting the execution of the program;
   (f) communicating the page error to the exception handler;
   (g) removing the condition causing said page error;
   (h) the exception handler forwarding the page error to the manipulating module;
   (i) said manipulating module being executed, causing manipulation of said one program block of the program blocks; and
   (j) continuing execution of the program.

10. The computer program product as claimed in claim 9, wherein the manipulation is effected only if during execution of the program, no code of said one program block has been executed yet.

11. The computer program product as claimed in claim 9, wherein the manipulation comprises at least one of loading the first program block into the main memory and decrypting said one program block.

12. The computer program product as claimed in claim 9, wherein, during said manipulation, at least another of the program blocks is manipulated in addition to manipulating said one program block.

13. The computer program product as claimed in claim 12, wherein the manipulation comprises at least one of loading said at least another program block into the main memory and decrypting said at least another program block.

14. The computer program product as claimed in claim 9, wherein said operating system comprises a virtual memory management and the predetermined page error is a specific page error of the virtual memory management.

15. The computer program product as claimed in claim 9, wherein, when the computer program product is stored on a second computer and the main section has been transmitted to the first computer, the manipulating module, while manipulating said one program block, effects transmission thereof from the second to the first computer.

16. The computer program product as claimed in claim 9, wherein said one program block is provided with an attribute generating the page error.

17. The computer program product as claimed in claim 9, wherein, when the computer program product is stored on a second computer and the main section has been transmitted to the first computer, the manipulating module, while manipulating said one program block, effects transmission thereof from the second to the first computer, wherein in the main section a placeholder is provided for said one program block, which is smaller than said one program block and occupies the space required by said one program block in the first computer, the predetermined page error being generated if, upon attempting to access said one program block, an attempt is made to access the placeholder, and wherein the placeholder is provided with the attribute generating the page error.

18. The computer program product as claimed in claim 9, wherein the method further includes the step of hooking the manipulating module in the exception handler, thereby informing the manipulating module about page errors.

* * * * *